US007004338B2

(12) United States Patent
Franzen et al.

(10) Patent No.: US 7,004,338 B2
(45) Date of Patent: Feb. 28, 2006

(54) EMPTY CONTAINER STORAGE FOR THE INTERMEDIATE STORAGE OF EMPTY ISO CONTAINERS

(75) Inventors: Hermann Franzen, Mönchengladbach (DE); Joachim Kröll, Jüchen (DE)

(73) Assignee: Demag Mobile Cranes GmbH, Zweibruecken (DE)

( * ) Notice: Subject to any disclaimer, the term of this patent is extended or adjusted under 35 U.S.C. 154(b) by 106 days.

(21) Appl. No.: 10/204,296

(22) PCT Filed: Jan. 23, 2001

(86) PCT No.: PCT/DE01/00317

§ 371 (c)(1),
(2), (4) Date: Sep. 12, 2002

(87) PCT Pub. No.: WO01/62656

PCT Pub. Date: Aug. 30, 2001

(65) Prior Publication Data

US 2003/0077154 A1 Apr. 24, 2003

(30) Foreign Application Priority Data

Feb. 23, 2000 (DE) ................................ 100 09 737

(51) Int. Cl.
*B66C 17/20* (2006.01)

(52) U.S. Cl. ................... 212/319; 212/334; 414/140.3; 414/591

(58) Field of Classification Search ................ 212/319, 212/333, 334, 342, 335; 414/140.3, 591
See application file for complete search history.

(56) References Cited

U.S. PATENT DOCUMENTS 3,559,822 A * 2/1971 Lichtenford et al. ..... 414/140.3
3,741,409 A * 6/1973 Painter ....................... 414/733
4,496,063 A * 1/1985 Ishii et al. .................. 212/270
4,610,594 A * 9/1986 Lane ....................... 414/792.9
5,718,550 A * 2/1998 Lanigan et al. .......... 414/140.3
5,727,702 A * 3/1998 Kullmann et al. .......... 212/273
5,915,906 A * 6/1999 Lucking et al. .......... 414/142.8

FOREIGN PATENT DOCUMENTS

JP 9-255112 * 9/1997

* cited by examiner

*Primary Examiner*—Thomas J. Brahan

(74) *Attorney, Agent, or Firm*—Cohen, Pontani, Lieberman & Pavane

(57) ABSTRACT

An empty container store for the temporary storage of empty ISO containers, in particular in fully automatic container terminals of sea ports or river ports includes a gantry bridge crane which spans the empty container store. The gantry bridge can be moved on an elevated craneway and has a traveling crab which can be moved thereon in the longitudinal direction thereof. A vertical lifting column is fastened to the traveling crab for lifting and lowering a load receiving means for the empty container. The load receiving means includes a spreader on a spreader support which is arranged on a spreader carriage which is guided on the lifting column by rollers on a spreader support.

11 Claims, 6 Drawing Sheets

EMPTY CONTAINER STORAGE FOR THE INTERMEDIATE STORAGE OF EMPTY ISO CONTAINERS

PRIORITY CLAIM

This is a U.S. national stage of application No. PCT/DE01/00317, filed on Jan. 23, 2001. Priority is claimed on that application and on the following application: Country: Germany, Application No.: 100 09 737.5, Filed: Feb. 23, 2000.

BACKGROUND OF THE INVENTION

1. Field of the Invention

The invention relates to an empty container store for the temporary storage of empty ISO containers, in particular in fully automatic container terminals of sea ports or river ports, having a gantry bridge crane which can be automated, spans the empty container store, can be moved on an elevated craneway and having a traveling crab which can be moved thereon in the longitudinal direction thereof and to which a vertical lifting column or a load receiving means which can be lifted and lowered and is intended for the empty container is fastened.

2. Description of the Prior Art

While fully automatic container terminals are becoming evermore widespread, empty container stores are currently only operated manually and cannot therefore be integrated into the fully automatic terminals controlled by superior storage logistics. The stacking and transporting of the empty containers takes place by means of reach stackers, fork lift trucks or similar mobile equipment which also undertake the transportation between the empty container store and the container storage modules.

SUMMARY OF THE INVENTION

The object of the present invention is to provide an empty container store which can be integrated into the fully automatic operation of a container terminal in order thereby to increase the handling capacity in comparison with the manually operated empty container store without additional costs.

In order to achieve this object, an empty container store is proposed according to the invention which is characterized in that the load receiving means is a spreader which is arranged on a spreader carriage, which is guided on the lifting column by means of rollers, on a spreader support.

The gantry bridge crane, which spans the entire empty container area and on which the stacking crane can be moved, is the basis of the system according to the invention. Gantry bridge cranes are known in principle and are available in a well-developed form. Elevators on a craneway enable the necessary stacking height of up to 8 containers which are stacked one above another to be reached, said containers being able to be picked up and lowered by the load receiving means which can be moved up and down on the vertical lifting column. The lifting column itself is part of the traveling crab which can be moved on the gantry bridge crane, and so every space of the empty container store can be reached by moving both the gantry bridge crane and the traveling crab.

The vertical lifting column advantageously comprises a lattice mast structure having preferably three chords on which the load receiving means is guided in a vertically moveable manner. The lattice mast, which is triangular in cross section, is, on the one hand, lightweight and, on the other hand, is sufficiently stable in order to hold the load receiving means together with the load and to guide it on the lifting column.

According to a further feature of the invention, the spreader carriage can be moved vertically on the lifting column by means of a double-cable lifting mechanism, deflection rollers for the cables being provided on the lifting column. The spreader for the ISO containers is arranged on a spreader support, which can be spread apart by the spreader carriage, and is set up in such a manner that it is able to grasp the different sizes of container.

According to another feature of the invention, it is provided that the spreader support with the spreader in the vertical longitudinal central plane of the spreader carriage can be pivoted from a position near to the lifting column into a position remote from the lifting column. This ability to pivot is used for the operation, which will be described later, of the load receiving means which is thereby capable of putting down or picking up the container at a certain distance from the lifting column.

The spreader support is advantageously connected to the spreader carriage via parallel links which can be pivoted by means of a piston/cylinder unit. The parallel link guide makes possible an essentially horizontal movement of the spreader support and therefore a favorable guiding of the load, spreader and empty container carrying out a curved movement as a function of the length of the parallel links.

The length of the parallel links and the pivoting movement thereof are coordinated with one another in such a manner that, according to a further feature of the invention, the spreader support together with the spreader in its pivoting position remote from the lifting column can be pivoted out to such an extent that when the lifting column is in a position near to the craneway rail, the spreader reaches through the posts of the craneway. This feature makes it possible to pivot with the spreader into a position which is arranged outside the empty container store. In this manner, containers which are stacked or transported outside the empty container store can be picked up or empty containers can be transferred out of the empty container store in order to be picked up outside the store.

When stacking the containers in the empty container store at a height of up to eight containers, at least the first stacking row may become unstable in the case of wind loads. In order to prevent this, according to a further feature of the invention, it is proposed that a bearing framework is provided in order to stabilize at least the first row of the container stacks in the region near to the craneway, said bearing framework comprising vertical columns or supports, the height of which corresponds to the height of the containers which can be stacked up to the maximum and the horizontal clearance of which is smaller than the longitudinal extent of the shortest container to be stacked, at least one lane being formed between two columns or supports through which even the longest container can be withdrawn in its transverse direction. The vertical pillars or supports, which are preferably embedded in the ground, prevent the stack from falling over and at the same time enable the containers to be withdrawn in a relatively large intermediate space between the columns or supports.

Finally, it is proposed, in addition, for the sorting in the container store to take place in accordance with size, height and design of the ISO containers. Since, as is known, the standard sizes of containers differ in terms of length and height, the containers have to be sorted in order to form stable and orderly stacks. Moreover, standard containers, open top containers, tank containers, bulk material containers and flads are in each case stacked separately, it also being possible to deposit the containers of diverse shipping firms in collective positions.

The present invention is advantageous because it provides the necessary supplementation to the fully automatic container store for a fully automatic container terminal. When the automatic stacking crane is used, the handling capacity is increased significantly in comparison to the manually operated empty container store without additional costs in comparison with the manual store arising.

BRIEF DESCRIPTION OF THE DRAWINGS

An exemplary embodiment of the invention will be illustrated in the drawing and described below. In the drawing.

DETAILED DESCRIPTION OF THE PRESENTLY PREFERRED EMBODIMENTS

Figure 1:
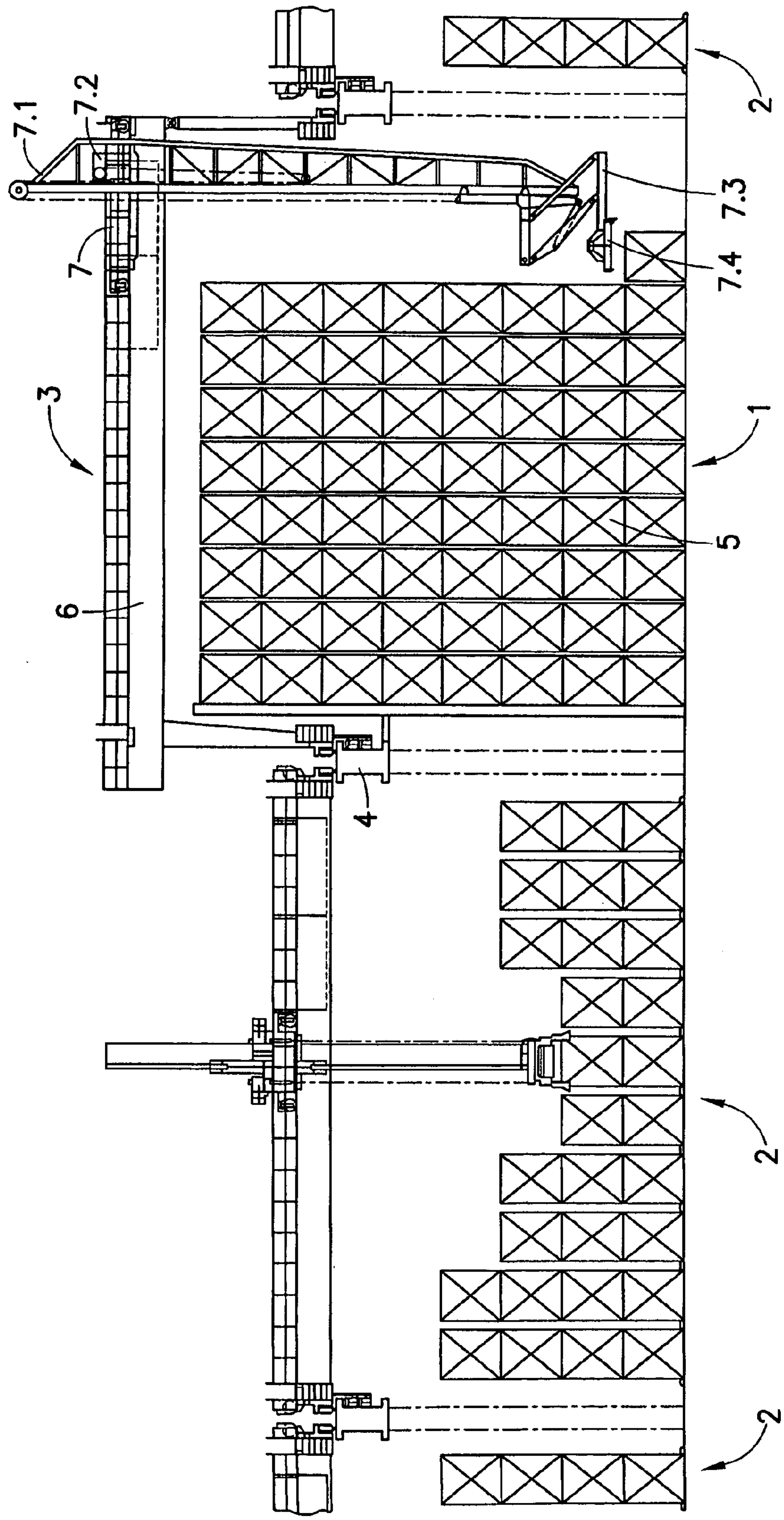
FIG. 1 shows a section through a container store with an integrated empty container store.

In FIG. 1, a cross section through an empty container storage module 1 according to the invention with adjacent container storage modules 2 is illustrated. In the empty container storage module 1, a stacking crane 3, which moves on the elevated craneways 4, serves the empty container store 5. The stacking crane 3 comprises the gantry-like bridge 6 and the crab 7. The main components of the crab are the three-chord mast 7.1, the double-cable lifting mechanism 7.2, the spreader carriage 7.3 and the spreader 7.4, which is mounted in a floating manner, in the position of minimum projection.

Figure 2:
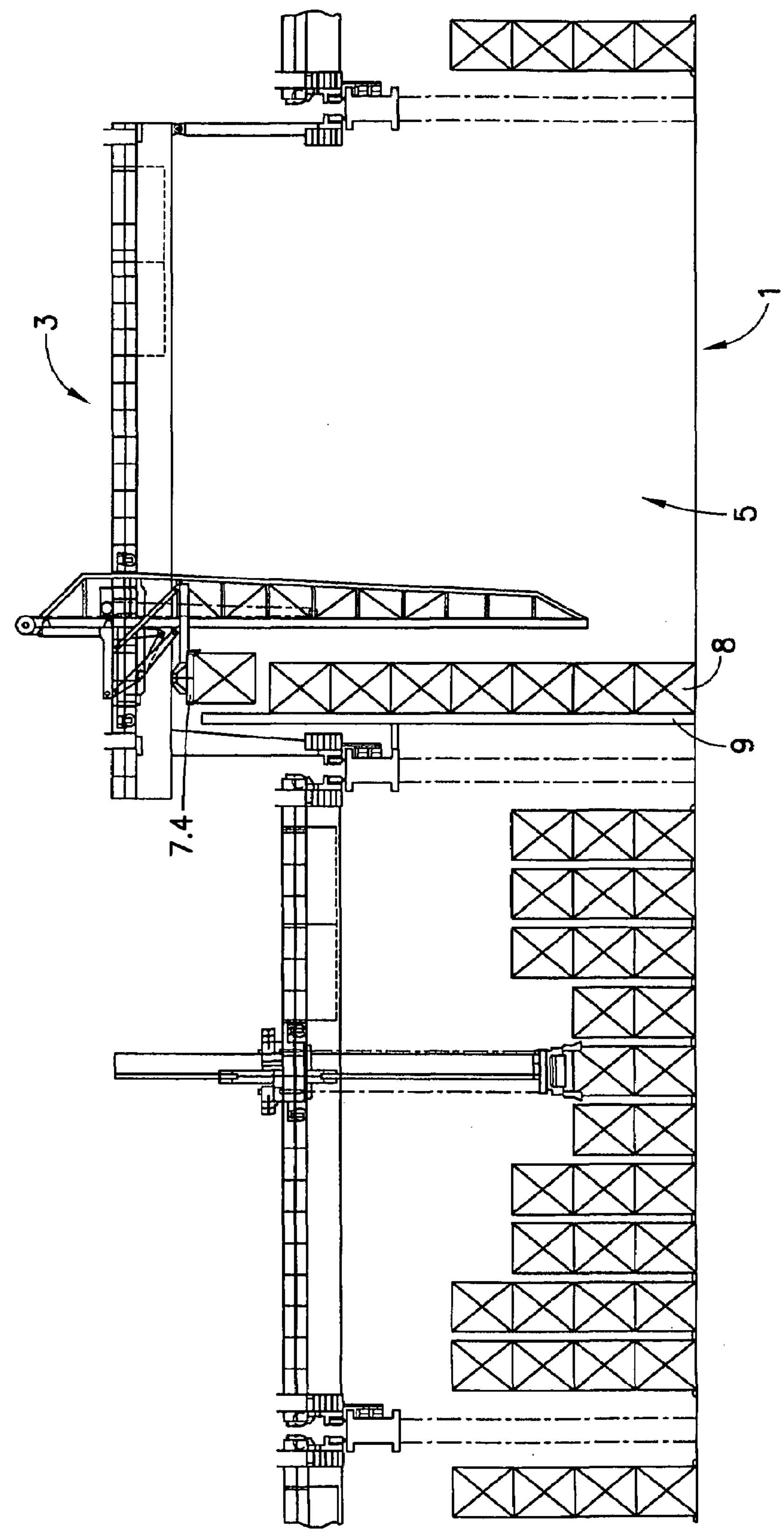
FIG. 2 shows the container store according to FIG. 1 during the construction of the first row of empty containers.

In FIG. 2, a section through the container store having an integrated empty container store according to FIG. 1 is likewise illustrated. The figure shows the empty container storage module 1 and the stacking crane 3 operating therein during construction of the first row of empty containers 8 in the empty container store 5. A bearing framework 9, which comprises supports embedded vertically in the ground, is used for stabilizing the first row. For this normal stacking activity, the spreader 7.4 is situated within the empty container store 5 in the position of minimum projection. The supports have a clearance therebetween allowing the transverse through passage of the empty containers.

Figure 3:
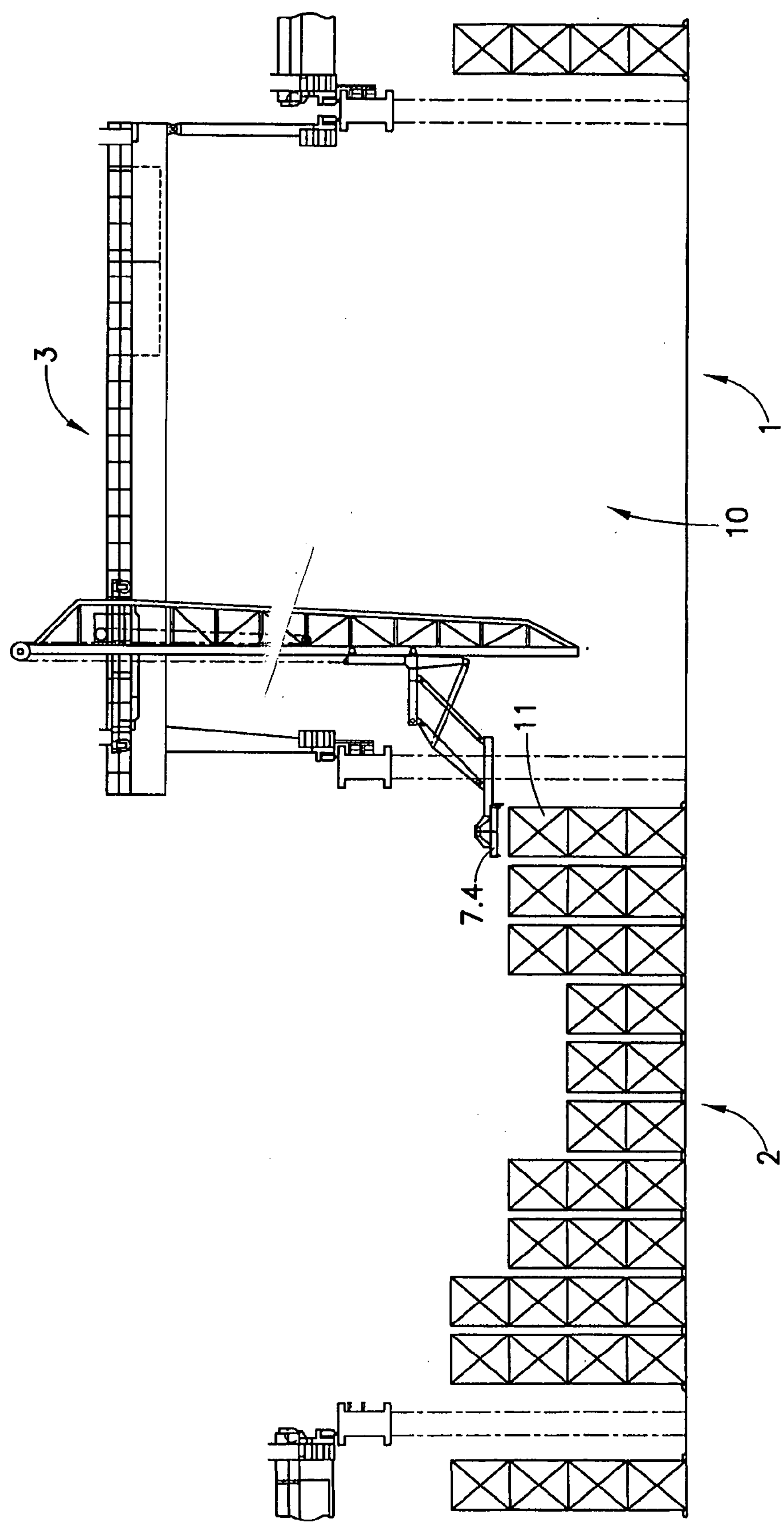
FIG. 3 shows a further section through the container store according to FIG. 1.

FIG. 3 shows the empty container storage module 1 and the stacking crane 3 operating therein in a loading region 10 outside the empty container store 5 during the transfer of an empty container 11 from the first row of the adjacent container storage module 2. For this handling activity outside the empty container store 5, the spreader has been pivoted into the position of maximum deflection.

Figure 4:
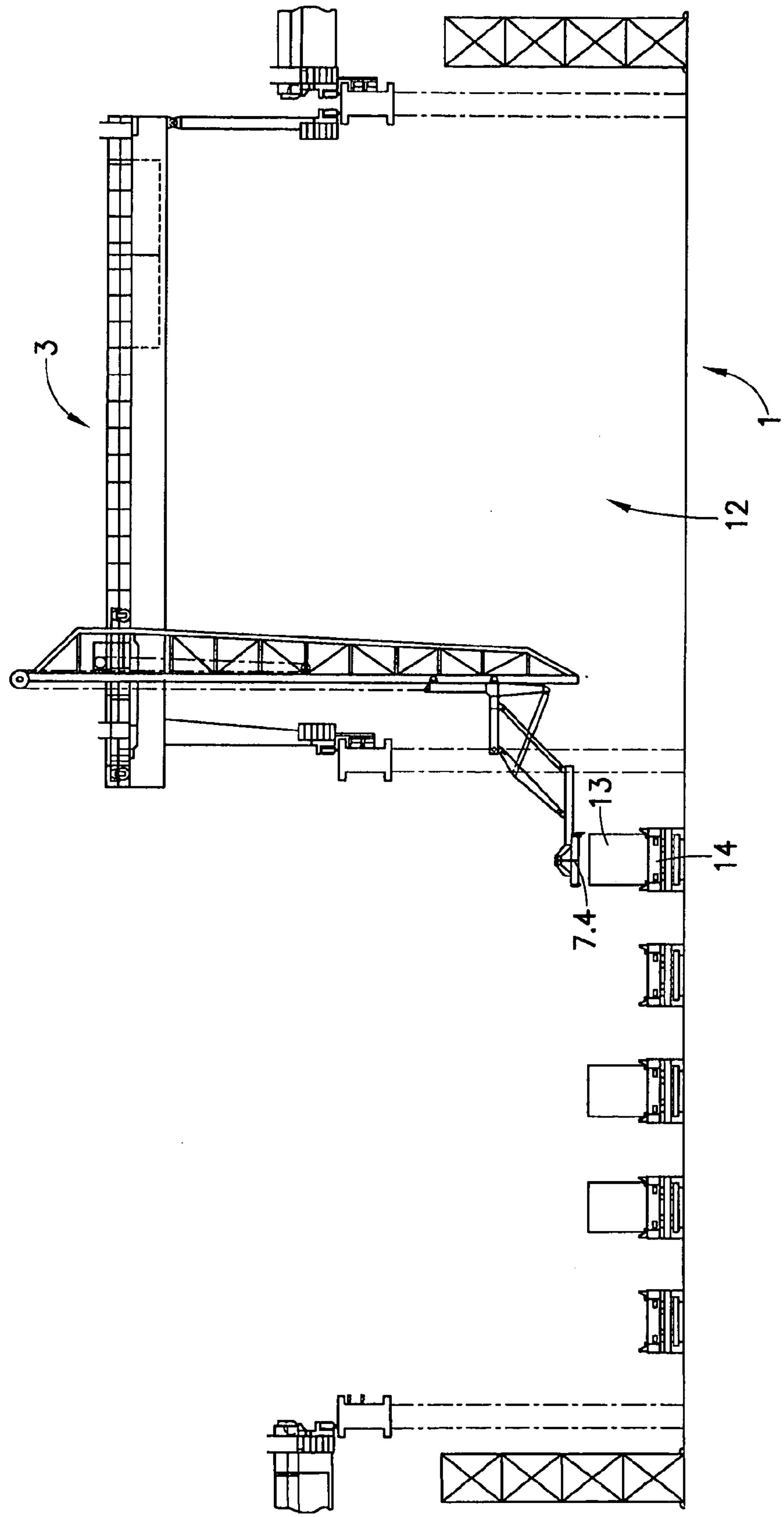
FIG. 4 shows the empty container storage module.

In FIG. 4, a further section through a container store having an integrated empty container store is illustrated. The figure shows the empty container storage module 1 and the stacking crane 3 therein in a loading region 12 outside the empty container store during the transfer of an empty container 13 from a driverless transport vehicle 14. For this handling activity outside the empty container store 5, the spreader 7.4 has been pivoted into the position of maximum projection.

Figure 6:
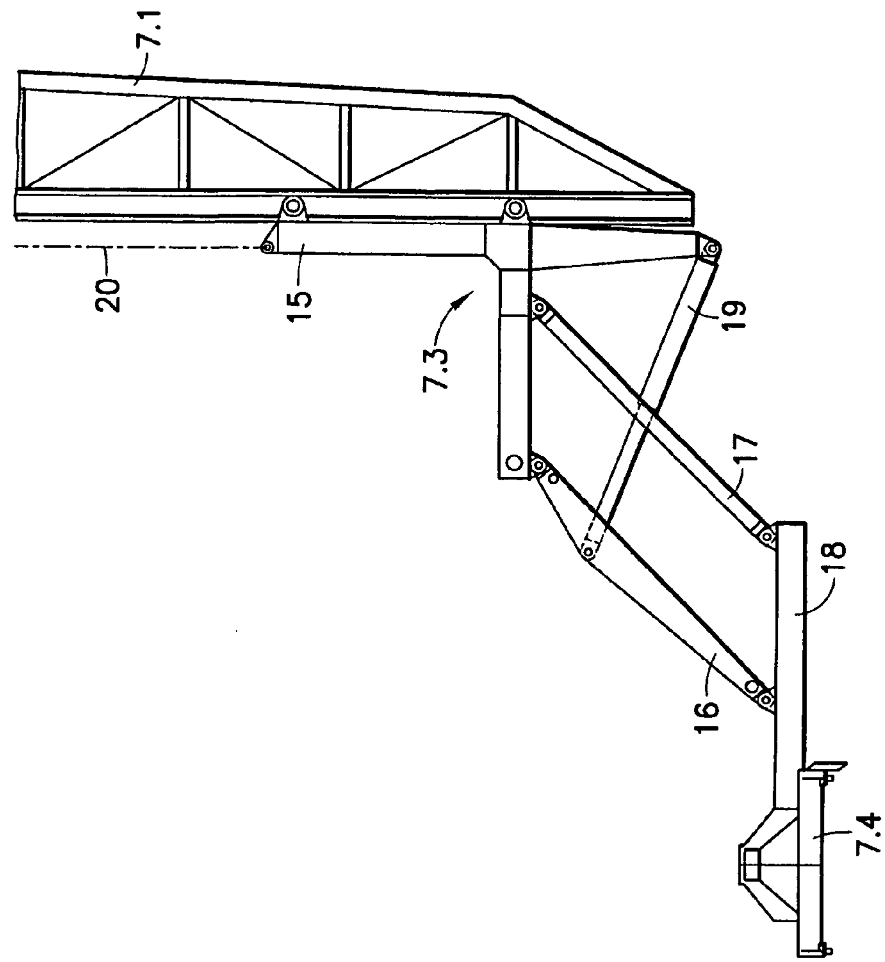
FIG. 6 shows a detailed view of the spreader support in the position with maximum projection.
Figure 5:
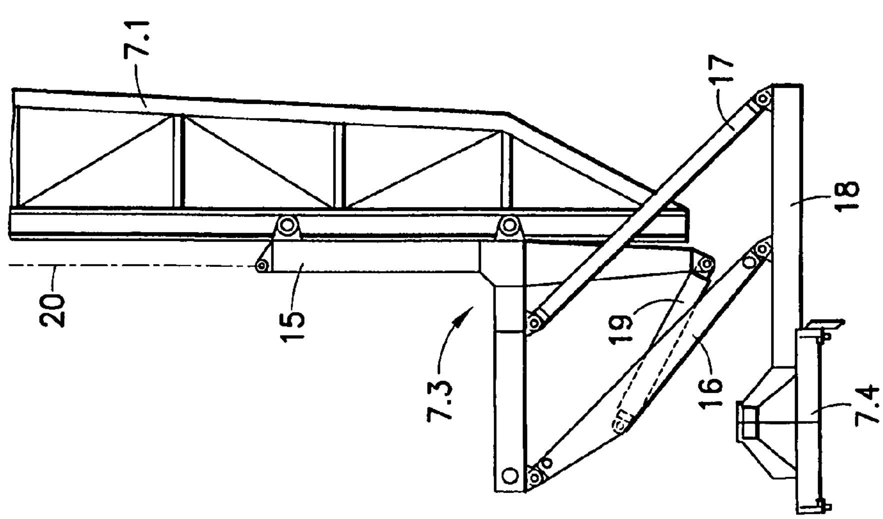
FIG. 5 shows a detailed view of the spreader support in the position with minimal projection.

The spreader support and the positions of minimum and maximum projection are illustrated in FIGS. 5 and 6. FIG. 5 shows the spreader carriage 7.3 comprising the guide frame 15, the strut links 16, the parallel links 17, the spreader support 18 and the spreader 7.4, which is mounted in a floating manner. The two lifting cylinders 19 determine the minimum end position of the spreader. By means of two cables 20 of the double lifting mechanism 7.2 the spreader carriage is moved for positioning in the vertical direction along the three-chord mast 7.1.

FIG. 6 shows the spreader carriage 7.3 in its maximum projection. The lifting cylinders 19 are completely extended, as a result of which the parallel links 17 and the strut links 16 pivot to the left in the drawing and therefore move the spreader support into a position in which it is remote from the three-chord mast.

Figure 7:
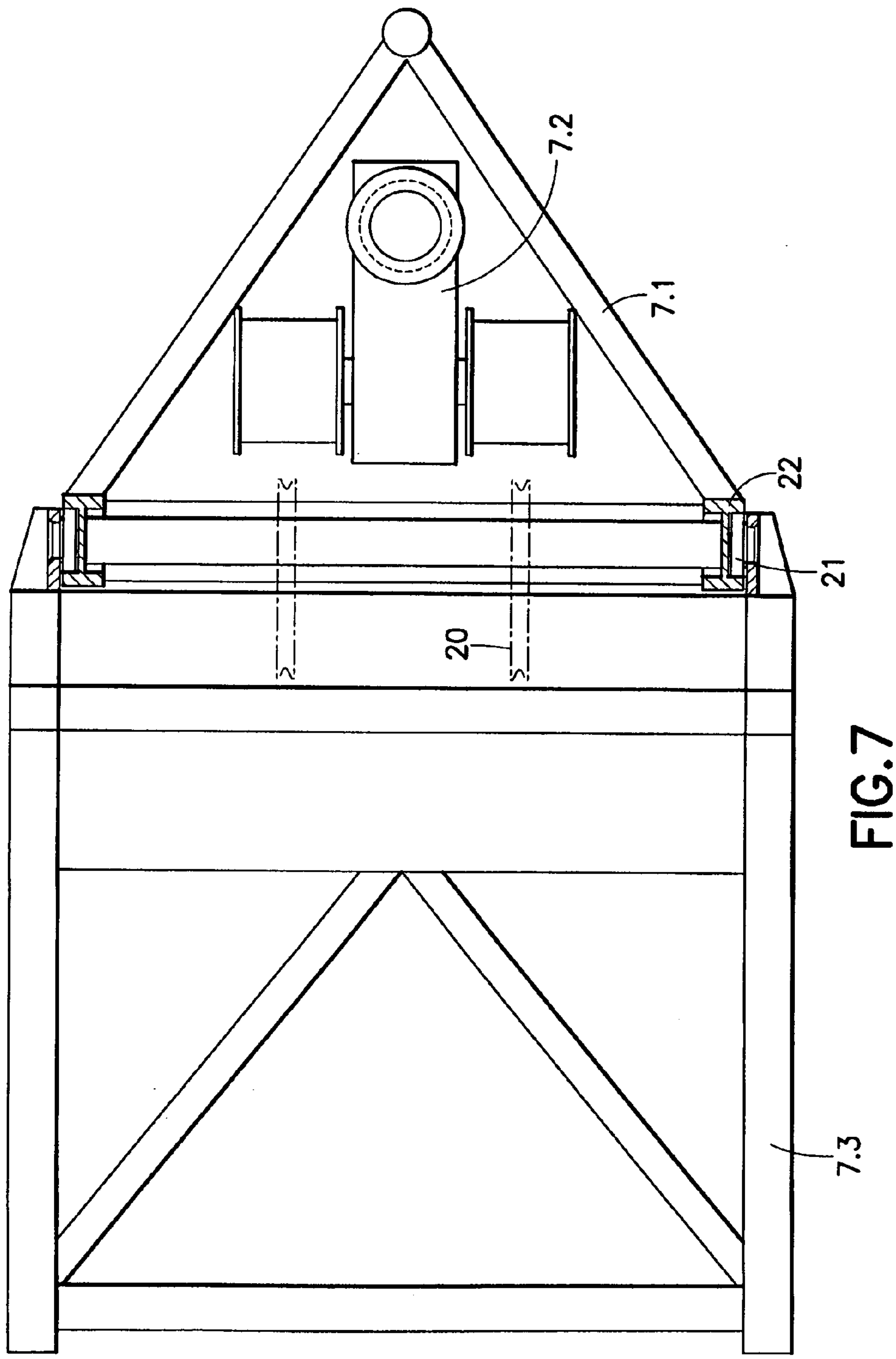
FIG. 7 shows a section through the three-chord mast above the spreader carriage.

FIG. 7 shows the three-chord mast 7.1, the double-cable lifting mechanism 7.2 and the spreader carriage 7.3 in cross section. The spreader carriage, which is guided on two double T supports 22 by four rollers 21 is suspended on the two lifting cables 20 and can be moved vertically on the three-chord mast by means of a lifting mechanism (not illustrated).

In order to stack the empty containers in the empty container store 5, the crab 7 moves together with the three-chord mast 7.1, which is arranged thereon, for example into the position illustrated in FIG. 3, the spreader 7.4 in its maximum projection reaching through the elevated craneway. The spreader picks up an empty container 11 and moves the latter through a lane formed between the craneway supports into the region of the empty container store 5. A first row 8 of empty containers, which is supported by the bearing framework 9, is stacked there, as illustrated in FIG. 2. Further rows are formed in the same manner (FIG. 1), the spreader 7.4 being positioned in the position according to the projection.

As described previously, the empty containers can be lifted off a driverless transport vehicle or can be placed thereon, as is illustrated schematically in FIG. 4. The sorting in the store expediently takes place according to container types, i.e. according to sizes (20', 30', 40', 45', 48', 50'), according to height (4', 4'6", 8', 8'6", 9', 9'6" and 9'6½"), design (standard container, open-top container, tank container, bulk material container and flads), and according to owners (diverse slipping firms).

The container store according to the invention operates fully automatically in accordance with an established program and can be integrated into the sequence of an automatic container terminal.

What is claimed is:

1. An empty container store for the temporary storage of empty ISO containers in a fully automatic container terminal of ports, comprising:

an elevated craneway;

a gantry bridge movably supported on said craneway and spanning the empty container store; and a traveling crab movably mounted on said gantry bridge for moving in a longitudinal direction of said gantry bridge, said traveling crab having a vertical lifting column and a load receiving means for receiving an empty container, said load receiving means being movable along said vertical lifting column, wherein said load receiving means comprises a spreader carriage guided on said vertical lifting column via rollers, a spreader support mounted on said spreader carriage and a spreader supported by said spreader support, and wherein said spreader support and said spreader are pivotable relative to said vertical lifting column from a first loading region proximate said lifting column to a second loading region remote from said lifting column, wherein said first and second loading regions are separate and non-overlapping.

2. The empty container store of claim 1, wherein said vertical lifting column comprises a lattice mast structure having three chords, said load receiving means being vertically movably guided on said lattice mast structure.

3. The empty container store of claim 2, further comprising a double cable lifting mechanism having deflection rollers arranged on said vertical lifting column for vertically moving said spreader carriage.

4. The empty container store of claim 1, wherein said traveling crab is movable to an end position proximate a rail of said craneway, wherein said spreader extends through posts of said craneway when said traveling crab is in the end position and said spreader is pivoted to said second position.

5. The empty container store of claim 1, further comprising a bearing framework arranged proximate said craneway for supporting at least a first row of empty containers in a region of the empty container store proximate said craneway, said bearing framework comprising vertical columns having a height corresponding to the height of the maximum number of stacked containers and a horizontal clearance allowing transverse through-passage of the empty containers and being smaller than a length of the shortest container to be stacked.

6. The empty container store of claim 1, further comprising a double cable lifting mechanism having deflection rollers arranged on said vertical lifting column for vertically moving said spreader carriage.

7. The empty container store of claim 1, wherein load receiving means further comprises parallel links connecting said spreader support to said spreader carriage and a piston-cylinder unit for pivoting said spreader support between said first and second positions.

8. The empty container store of claim 7, wherein said traveling crab is movable to an end position proximate a rail of said craneway, wherein said spreader extends through posts of said craneway when said traveling crab is in the end position and said spreader is pivoted to said second position.

9. The empty container store of claim 1, wherein said first loading region in within the empty container store and the second loading region is outside of the empty container store.

10. An empty container store for the temporary storage of empty ISO containers in a fully automatic container terminal of ports, comprising:

an elevated craneway;

a gantry bridge movably supported on said craneway and spanning the empty container store; and a traveling crab movably mounted on said gantry bridge for moving in a longitudinal direction of said gantry bridge, said traveling crab having a vertical lifting column and a load receiving means for receiving an empty container, said load receiving means being movable along said vertical lifting column, wherein said load receiving means comprises a spreader carriage guided on said vertical lifting column via rollers, a spreader support mounted on said spreader carriage and a spreader supported by said spreader support, wherein said spreader support and said spreader are pivotable from a first position proximate said lifting column to a second position remote from said lifting column, and wherein load receiving means further comprises parallel links connecting said spreader support to said spreader carriage and a piston-cylinder unit for pivoting said spreader support between said first and second positions.

11. The empty container store of claim 10, wherein said traveling crab is movable to an end position proximate a rail of said craneway, wherein said spreader extends through posts of said craneway when said traveling crab is in the end position and said spreader is pivoted to said second position.

* * * * *

UNITED STATES PATENT AND TRADEMARK OFFICE

CERTIFICATE OF CORRECTION

PATENT NO. : 7,004,338 B2
APPLICATION NO. : 10/204296
DATED : February 28, 2006
INVENTOR(S) : Hermann Franzen It is certified that error appears in the above-identified patent and that said Letters Patent is hereby corrected as shown below:

On the title page item [73] should read:

--(73) Assignee: Gottwald Port Technology GmbH
Düsseldorf (DE)--

Signed and Sealed this

Nineteenth Day of February, 2008

JON W. DUDAS
*Director of the United States Patent and Trademark Office*